(12) United States Patent
Mangano et al.

(10) Patent No.: US 9,100,354 B2
(45) Date of Patent: Aug. 4, 2015

(54) CONTROL DEVICE, FOR INSTANCE FOR SYSTEMS-ON-CHIP, AND CORRESPONDING METHOD

(71) Applicants: STMicroelectronics Srl, Agrate Brianza (IT); STMicroelectronics (Grenoble2) SAS, Grenoble (FR)

(72) Inventors: Daniele Mangano, San Gregorio, CT (US); Ignazio Antonino Urzi, Voreppe (FR); Giovanni Strano, Taormina (IT)

(73) Assignees: STMICROELECTRONICS SRL, Agrate Brianza (MB) (IT); STMICROELECTRONICS (GRENOBLE 2) SAS, Grenoble (FR)

( * ) Notice: Subject to any disclaimer, the term of this patent is extended or adjusted under 35 U.S.C. 154(b) by 141 days.

(21) Appl. No.: 13/690,109

(22) Filed: Nov. 30, 2012

(65) Prior Publication Data
US 2013/0163615 A1    Jun. 27, 2013

(30) Foreign Application Priority Data

Dec. 21, 2011  (IT) ................ TO2011A1180

(51) Int. Cl.
| | | |
|---|---|---|
| *H04J 3/22* | (2006.01) | |
| *H04L 12/911* | (2013.01) | |
| *H04L 12/873* | (2013.01) | |
| *H04L 12/933* | (2013.01) | |

(52) U.S. Cl.
CPC .............. *H04L 47/783* (2013.01); *H04L 47/52* (2013.01); *H04L 49/109* (2013.01)

(58) Field of Classification Search
CPC ... H04L 47/783; H04L 47/52; H04L 12/5695; H04L 47/781; H04L 49/109; H04L 47/826; H04L 47/822; H04L 47/2416; H04L 47/2433; H04L 49/254; H04L 47/39; H04L 1/1854; H04L 1/1861; H04L 12/1877; H04L 12/5693; H04L 2012/2843; H04L 2012/5679; H04L 25/0272; H04L 25/0294; H04L 41/0896; H04L 45/245; H04L 47/10; H04L 47/15; H04L 47/215; H04L 47/22; H04L 47/25; H04L 47/70; H04L 47/76; H04L 47/762; H04L 47/765; H04L 47/801; H04L 47/803; H04L 47/806; H04L 47/828; H04L 49/101; H04L 49/3009; H04L 5/0053; H04L 5/14; H04L 5/143; H04L 5/18; H04W 16/02; H04W 28/20; H04W 72/04; H04W 72/0406; H04W 72/0413; H04W 72/042; H04W 72/0453; H04W 72/12; H04W 72/1284; H04W 74/004; H04W 74/06; H04W 84/18
USPC ......... 370/468, 402, 232, 235, 252, 258, 315, 370/316, 329, 346, 389, 395.41, 401, 419, 370/4, 27, 431, 438, 449, 458, 467, 477; 709/221, 225
See application file for complete search history.

(56) References Cited

U.S. PATENT DOCUMENTS

| | | | |
|---|---|---|---|
| 7,724,735 B2 | 5/2010 | Locatelli et al. | |
| 7,831,801 B1 * | 11/2010 | Anderson ..................... | 712/11 |
| 2007/0274331 A1 | 11/2007 | Locatelli et al. | |
| 2009/0213871 A1 * | 8/2009 | Carlson et al. ................ | 370/462 |
| 2010/0281144 A1 | 11/2010 | Mangano et al. | |
| 2011/0242974 A1 * | 10/2011 | Das et al. ...................... | 370/230 |
| 2011/0317691 A1 * | 12/2011 | Kajihara ....................... | 370/359 |

FOREIGN PATENT DOCUMENTS

| | | |
|---|---|---|
| EP | 1 863 232 A1 | 12/2007 |
| EP | 2 247 045 A1 | 11/2010 |
| WO | 99/54805 A2 | 10/1999 |

OTHER PUBLICATIONS

Akhtar et al., "An Intelligent Arbiter for Fair Bandwidth Allocation," 2011 IEEE Student Conference on Research and Development, Dec. 19, 2011, pp. 304-309.
Dolama et al., "Multi Group Dynamic Bandwidth Allocation Scheme in Long Reach PONs," 2010 IEEE 5$^{th}$ International Symposium on Telecommunications, Dec. 4, 2010, pp. 163-168.

Italian Search Report dated Sep. 21, 2012, for corresponding IT Patent Application No. TO20111180, 2 pages.
Li et al., "An Adaptive Arbitration Algorithm for SoC Bus," IEEE International Conference on Networking, Architecture, and Storage, Jul. 1, 2007, pp. 245-246.

* cited by examiner

*Primary Examiner* — Charles C Jiang
*Assistant Examiner* — Rose Clark
(74) *Attorney, Agent, or Firm* — Seed IP Law Group PLLC

(57) ABSTRACT

A system comprises a resource, such as an interconnection, for example, of the Network-on-Chip (NoC) type, having an overall bandwidth available for allocation to a set of initiators that compete for allocation of the overall bandwidth. The system includes a communication arbiter for allocating the overall bandwidth to the initiators according to respective values of bandwidth requested (RBW) by the initiators. A control device (50) is configured to detect the deviation between the value of bandwidth allocated to the initiators and the respective value of requested bandwidth and allocate the overall bandwidth to the initiators in a dynamic way minimizing the mean value of the deviation.

16 Claims, 5 Drawing Sheets

CONTROL DEVICE, FOR INSTANCE FOR SYSTEMS-ON-CHIP, AND CORRESPONDING METHOD

PRIORITY CLAIM

The present application claims priority to Italian Patent Application Serial No. TO2001A001180 filed Dec. 21, 2011, the entire disclosure of which is hereby incorporated by reference.

TECHNICAL FIELD

The present disclosure relates to devices for control of communications, for example for so-called Systems-on-Chip (SoCs). Various embodiments may refer to control devices for allocation of resources within a System-on-Chip.

TECHNOLOGICAL BACKGROUND

System-on-Chip technology enables even rather complex systems for communication between various modules of an integrated circuit (for example, a processing unit, memories, peripherals, and other dedicated units) to be implemented so as to ensure that system performance specifications are met.

Various possible applications provided by a SoC may be subjected to specific constraints in terms of bandwidth, and the corresponding interconnection may need to be able to offer a certain quality of service (QoS) so as to guarantee, for example, a minimum value of bandwidth in the communications between modules, with modules that may also present requirements that differ from one to another and/or that vary over time.

For example, US 2007/0274331 A1 (which corresponds to EP 1 863 232 A1) describes a bandwidth-allocating device comprising network interfaces with means for filling a header field of each data packet transmitted with header-field information that depends upon a value of requested bandwidth. The transmission of the data packets through the router of the system is controlled according to the information provided in the header field of each data packet.

In US 2010/081144 (which corresponds to EP 2 247 045A1), a device is described for measuring the bandwidth used by each initiator (Measured Bandwidth MBW) and comparing the measured value with the value of requested bandwidth (Requested Bandwidth—RBW). When the measured bandwidth is less than the requested bandwidth, the control device increases the value of a priority associated to the transfer, and vice versa, when the measured bandwidth exceeds the requested bandwidth, the priority is decreased. That document mentions also the possibility of modifying, instead of the priority, any other parameter that affects operation of the arbiter and has an effect on the bandwidth, such as, for example, the distance between the request transactions (transaction distance).

In summary, the solutions outlined previously aim at implementing a distributed arbitration mechanism based upon the "end-to-end" property, which identifies the possibility of fixing the requirements in terms of performance at the input points of the network, rendering the performance as independent as possible of what happens within the network itself.

In particular, the solution referred to in US 2007/0274331 A1 (which corresponds to EP 1 863 232 A1) implements an arbitration scheme of a round-robin end-to-end type with the possibility of fixing the requests in terms of bandwidth at the input points of the network. For the reasons outlined, this solution may present critical aspects of operation linked to the non-ideal behavior of real systems, which may be put down, for example, to the fact that the traffic associated to the initiators (IP) may not be uniform and may be subject to conversions (both of frequency and of size of the data), interference in terms of traffic on the network, variations of the storage efficiency, and a certain "granularity" of the arbitration action.

There is, therefore, a need in the art for improved bandwidth allocation.

SUMMARY

The present disclosure provides a solution overcoming limitation of bandwidth allocation.

In various embodiments, that solution is achieved thanks to a device having the characteristics recalled specifically in the ensuing claims. The present disclosure also regards a corresponding method. The claims form an integral part of the technical disclosure provided herein in relation to the present disclosure.

Various embodiments may be based upon a mechanism of "recovery" of the bandwidth that is intrinsically robust, i.e., able to operate correctly in all the conditions of practical use considered.

Various embodiments may be based upon dynamically adapting the bandwidth-allocation parameters based upon unexpected effects due to the unpredictability of the behavior of the application.

Various embodiments enable improvement of the performance in terms of time-to-market, reducing the commitment required for developing a system in the design step and likewise enabling the developers of application software to define easily, for example via software, the performance requirements.

Various embodiments enable preservation of the advantages in terms of quality of service (QoS) of known solutions and make possible at the same time overcoming the intrinsic limitations of such solutions, enabling applications to implement complex scenarios.

Various embodiments enable SoC products characterized by a high degree of flexibility to be implemented.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The present disclosure is now described, purely by way of non-limiting examples, with reference to the annexed FIGURES, wherein.

DETAILED DESCRIPTION

FIGS. 4 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. In the ensuing description, various specific details are illustrated aimed at an in-depth understanding of various embodiments. The embodiments may be provided without one or more of the specific details, or with other methods, components, materials, etc. In other cases, known structures, materials, or operations are not shown or described in detail to prevent the various aspects of the embodiments from being obscured.

The reference to "an embodiment" or "one embodiment" in the framework of the present description has the purpose of indicating that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Moreover, particular conformations, structures, or characteristics may be combined in any adequate way in one or more embodiments. The references used herein are only provided for convenience and hence do not define the sphere of protection or the scope of the embodiments.

Figure 1:
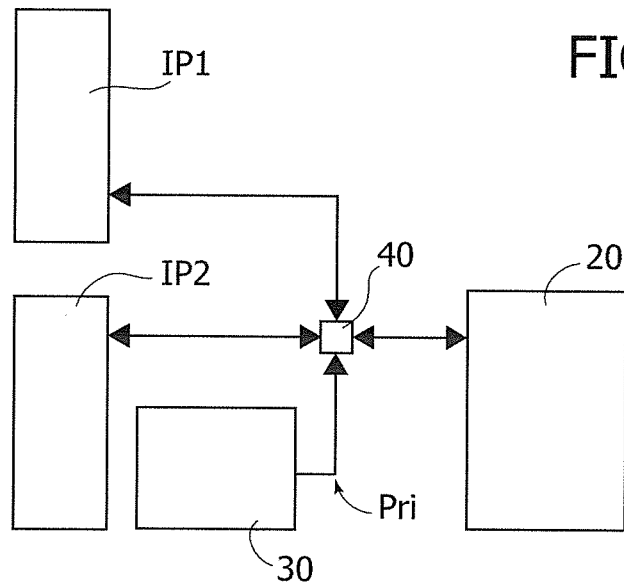
FIG. 1 illustrates a block diagram of a Network-on-Chip (NoC) that may be implemented within an integrated circuit in which embodiments of the present disclosure may be implemented.

The block diagram of FIG. 1 illustrates a possible context of Network-on-Chip (NoC) that may be implemented within an integrated circuit. Represented in the block diagram of FIG. 1 are two "initiators" IP1 and IP2, each of which access an interconnection 20 such as an integrated computing network (ICN), for example a "network fabric" of a NoC. Access (in transmission and/or in reception, according to the characteristics of the individual initiator) is controlled by a communication arbiter 40, which has the function of deciding which initiator module gains access to the interconnection 20, viewed as a requested target.

The initiators IP1, IP2 may be, for example, network interfaces (NIs), or else, in general, more complex modules such as, for example, Intellectual Property (IP) Cores.

In various embodiments, the arbiter 40 may also form part of the interconnection 20; for example, when the interconnection is a NoC, the arbiter 40 may be at least in part implemented in the internal interconnection nodes of the NoC.

The arbiter 40 is controlled by a module 30, which defines the modalities of operation of the arbiter 40, in particular determining the priority between the initiators IP1, IP2 in gaining access to the resource 20.

Once again with reference to the same basic diagram, the system schematically represented in FIG. 1 might be more complex and comprise, for example, a greater number of initiators (for example, additional IP initiators and/or IP Core initiators). Reference to the presence of just two initiators IP1, IP2 merely has the purpose of example and is used herein for simplicity of illustration.

The overall diagram represented in FIG. 1 hence corresponds to the presence of a control device for a system comprising an interconnection (designated by 20, in the example considered) having an overall bandwidth available in allocation for a set of initiator modules (the modules IP1 and IP2, in the example considered herein) that compete in accessing the overall bandwidth, with at least one communication arbiter (designated by 40, in the example considered) for deciding which communications (in transmission and/or reception) of the initiator modules gain access to the interconnection, the aforethe overall bandwidth being allocated to the initiator modules (IP1, IP2) according to respective values of bandwidth requested by the initiator modules.

Figure 2:
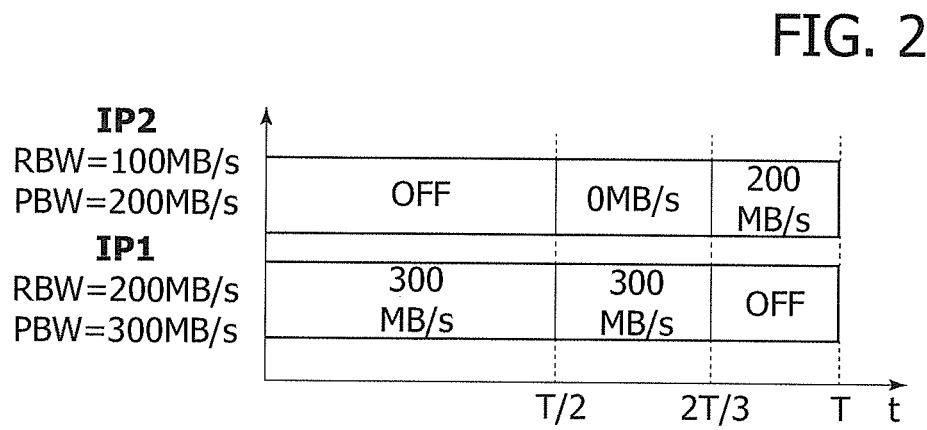
FIGS. 2 and 3 illustrate two possible strategies of allocation of overall bandwidth
Figure 3:
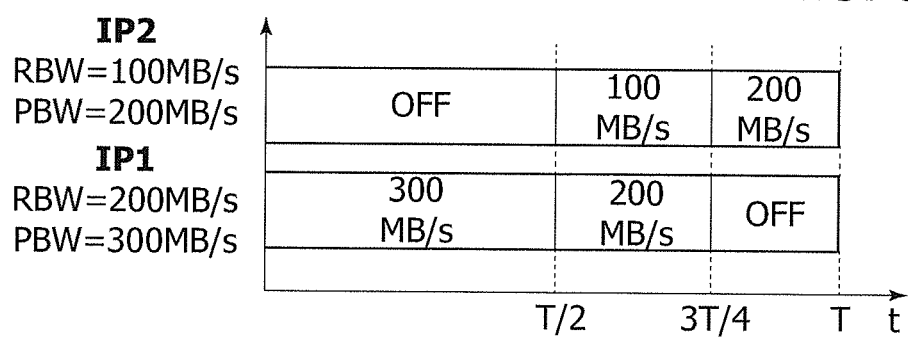

The diagrams of FIGS. 2 and 3 illustrate two possible strategies of allocation of the overall bandwidth (or overall capacity). The diagrams in question refer, by way of example, to a time interval of duration T where the capacity or overall bandwidth available is 300 MB/s and where the two initiator modules IP1 and IP2 have values of requested bandwidth of 200 MB/s and 100 MB/s, respectively.

The diagram of FIG. 2 refers to an arbitration mechanism based upon a fixed-priority mechanism, in a situation where the initiator IP1 always has priority, i.e., the precedence in accessing the interconnection 20. In the diagram of FIG. 2, it is assumed that throughout the interval 0-T/2 the initiator IP2 is de-activated ("OFF") so that all the capacity available of 300 MB/s is made available for the initiator IP1 even if the value of bandwidth requested by the initiator IP1 itself is only 200 MB/s (RBW=200 MB/s).

That situation persists also during the interval T/2-2T/3 in which the initiator IP2 is activated and inhibited in gaining access to the interconnection 20 (0 MB/s) owing to the fact that the interconnection 20 is totally dedicated to the other initiator IP1, which has the priority. The situation changes at the instant 2T/3 when the first initiator is de-activated ("OFF") so that during the interval 2T/3-T the second initiator IP may start to communicate through the interconnection 20 and transmit, for example, at a rate of 200 MB/s even, though in actual fact its value of requested bandwidth is only 100 MB/s (RBW=100 MB/s).

The fixed-priority scheme schematically represented in FIG. 2 is largely inefficient in so far as: throughout the interval 0-T the communication requirements of second initiator IP2 are met only in part, even though a margin of recovery is available during the interval 2T/3-T in which the first initiator IP1 has ceased to transmit.

The diagram of FIG. 3 refers to a scheme of allocation of the overall available bandwidth (once again assumed as being 300 MB/s) implemented in a less rigid way, namely, recognizing during the interval T/2-3T/4 the fact that the bandwidth requested by the first initiator IP1, equal to 200 MB/s, leaves a fraction of the overall bandwidth (fraction equal to 100 MB/s) available, which may be used for meeting the requirements of the second initiator IP2.

The solution represented in FIG. 3 is better than the one represented in FIG. 2. However, once again, it does not satisfy in a complete way the requirements of the second initiator IP2, whereas, on the other hand, during the interval 3T/4-T a part of the overall bandwidth available (equal to 300 MB/s− 200 MB/s=100 MB/s) is not used.

Various embodiments may refer to the general context already recalled by way of example with reference to FIG. 1, hence to provision of a control device/method (bandwidth allocation) for a system comprising an interconnection 20, for example within a Network-on-Chip (NoC), having an overall bandwidth available for allocation and, a set of initiator modules IP1, IP2 (for simplicity of illustration reference will be made to just two modules of this kind, even though various embodiments may comprise a greater number thereof), which compete in accessing the overall bandwidth. At least one communication arbiter 40 is present, designed to decide which of the initiator modules gains access to the interconnection 20, allocating the overall bandwidth according to respective values of requested bandwidth (RBW) of the initiator modules IP1, IP2.

Figure 4:
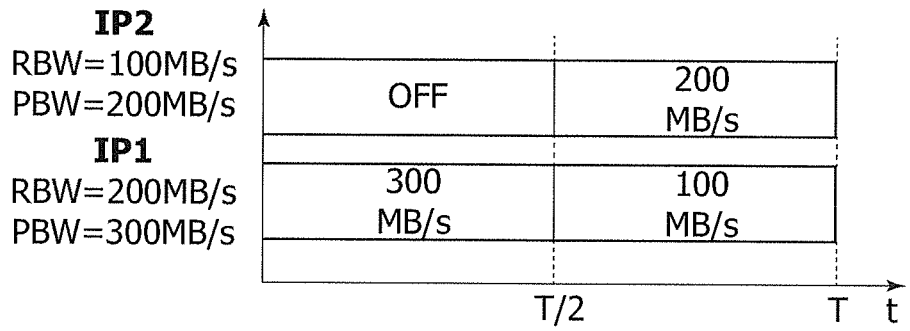
FIG. 4 illustrates an example of criteria of operation of embodiments of the present disclosure.

The diagram of FIG. 4 illustrates, for direct comparison with the diagrams of FIGS. 2 and 3 already described previously, how the same requirements of the initiator modules IP1 and IP2 (requested bandwidths RBW equal to 200 MB/s and 100 MB/s, respectively) may be met in the time interval 0-T, on the one hand making it possible to satisfy fully the requirements of the initiator IP2—which does not occur adopting the solutions represented in FIGS. 2 and 3—and at the same time using in a complete way the overall bandwidth of the interconnection available for allocation (300 MB/s).

For direct comparison with the diagrams of FIGS. 2 and 3 it will be noted that, adopting the solution referred in FIG. 4, once again the interval 0-T/2 is used allocating to the initiator IP1 the entire overall bandwidth available 300 MB/s. It may moreover be noted that, during that interval, the bandwidth used by the initiator IP1 (300 MB/s) is in excess (by 100 MB/s) with respect to the requested bandwidth (RBW=200 MB/s) so that, so to speak, during the interval 0-T/2, the first initiator IP1 has already received "more" than it requested.

That observation is exploited by acting in such a way that during the subsequent interval T/2-T the initiator IP1 will receive only "the amount that remains" to reach the requested value, it thus being possible to reduce to 100 MB/s the bandwidth allocated thereto, whilst the rest of the bandwidth available (300 MB/s−100 MB/s=200 MB/s) is completely used for satisfying the transmission requirement of the second initiator IP2.

During the interval T/2-T, to the initiator IP2 there is thus allocated a bandwidth of 200 MB/s (equal to twice the requested bandwidth RBW=100 MB/s), with the consequent possibility of exploiting the greater allocated bandwidth for "recovering" the impossibility of communicating during the interval 0-T/2 in which all the bandwidth available was allocated to the first initiator IP1.

It will be appreciated that various embodiments may regard specifically the modalities or criteria adopted for deciding which initiator module or modules accesses/access the interconnection—and not the specific modalities adopted for carrying out the action of allocation.

For the above purpose, it is possible to resort to any known solution, for example to the one described in the document No. US 2007/0274331 A1 already cited previously, to which the reader is referred for a more detailed description.

Figure 5:
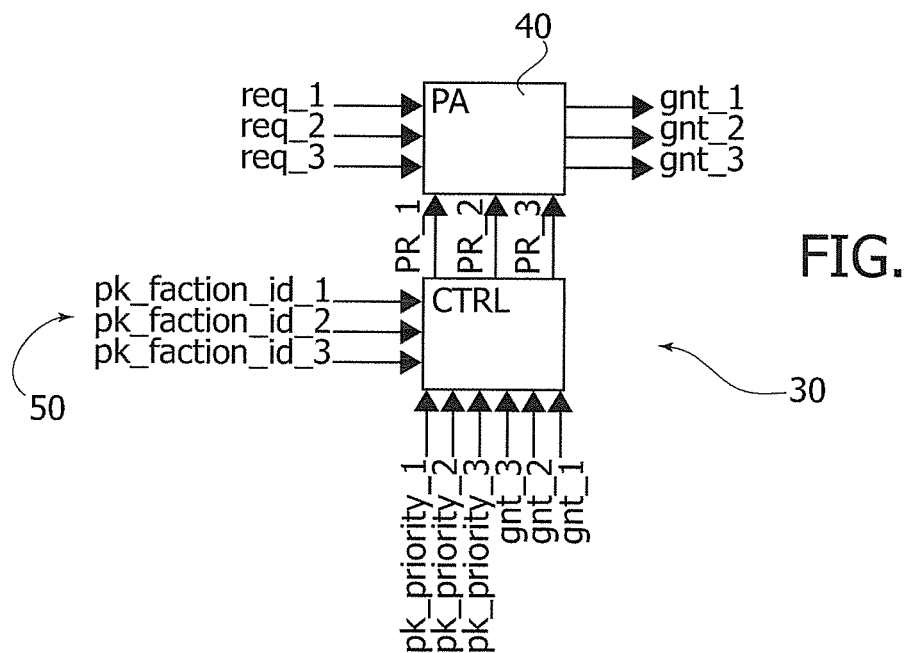
FIG. 5 illustrates possible modalities of performance of an arbitration action in accordance with various embodiments of the present disclosure.

For what is of interest herein, FIG. 5 is a schematic illustration provided by way of example of a solution in which each time a data packet is introduced into the NoC, the packets are initially tagged with information elements referred to as pk_faction_id_1, pk_faction_id_2 or pk_faction_id_3 attributed according to the requested bandwidth.

In various embodiments, the relation between the bandwidth and the quantity pk_faction_id may be obtained by controlling the number of consecutive packets for which the same pk_faction_id is used. For example, in a simple case with just two initiator modules that generate packets of the same size, to obtain that the initiator2 has a bandwidth that is twice that of the initiator1, the pk_faction_id_1 (of the initiator1) might change with a frequency that is twice that of the pk_faction_id2 (of the initiator2), obtaining for example the sequences: pk_faction_id_1→01010101 and pk_faction_id_2→00110011.

In this way, resorting to the solution described in US 2007/0274331 A1 (to which there corresponds EP 1 863 232 A1) I possible, where all the routers/arbiters let through first all the packets with pk_faction_id=0 and then the packets with pk_faction_id−1, so obtaining that in a given time interval the initiator 1 transfers one packet and the initiator2 transfers two packets (bandwidth ration 1:2).

In various embodiments, it is possible to control dynamically, according to a closed-loop approach, the frequencies of variation of the factions (pk_faction_id) in such a way as to correct altogether automatically the effects due to the non-idealities discussed in the introductory part.

The packets of the various sources (initiators) are transferred at each router of the network in such a way that the packets that have the same priority information are grouped so as to move together.

By adopting such a solution, it is possible to envisage that, for example, the information of the header field and the value of information used for attributing the priority to the packets served less are encoded using one bit, whereas the information regarding the priority of the packet is encoded with two bits. Any other parameter that affects operation of the arbiter and has an effect on the bandwidth, such as, for example, the distance between the request transactions (transaction distance), may alternatively be used.

Resorting to the solution described in US 2010/0281144, the priority of the packets is used as additional information for carrying out a second-level arbitration, which may not be important for the purposes of the embodiments.

The value of requested bandwidth may be expressed in bytes and correspond to the overall amount of the data transferred calculated starting from the size of the opcode with reference to a network interface during one "round" (i.e., during a time interval of duration equal to T, or to a multiple thereof, with reference to the schemes of FIGS. 2 and 4).

In various embodiments, the frequency of variation of the quantity faction (pk_faction_id) may be expressed in some way through a number of bytes. This quantity may be referred to as a "threshold," and the theoretical and ideal relation between the bandwidth and this threshold may be expressed as:

$$BW_X = \frac{T_x}{T_1 + T_2 + \ldots + T_N} BW_{TOT},$$

where $T_1, T_2, \ldots, T_N$ are the thresholds associated to all the initiators of the system, BWx is the bandwidth of the x-th initiator, and $BW_{TOT}$ is the total bandwidth offered by the system using the information pk_faction_id in relation to a given target (in the example considered herein, the interconnection 20).

In the example illustrated schematically in FIG. 5, the lines indicated by req_1, req_2, req_3, ... represent the requests of service sent by the various initiators to the arbiter 40, while the lines gnt_1, gnt_2, gnt_3, ... represent granting of access by the arbiter 40 according to the priority-control data PR_1, PR_2, PR_3 supplied by the control module 30 according to the tags pk_faction_id_1, pk_faction_id_2, or pk_faction_id_3 already mentioned and other priority information pk_priority_1, pk_priority_2, pk_priority_3, gnt_3, gnt_2, gnt_1 representing the specific modalities of implementation of the action of allocation according to the specific strategy adopted, which may be, for example, RR ("Round-Robin"), WRR ("Weighted-Round-Robin"), or LRU ("Least-Recently-Used"), or of any one other known type.

Figure 6:
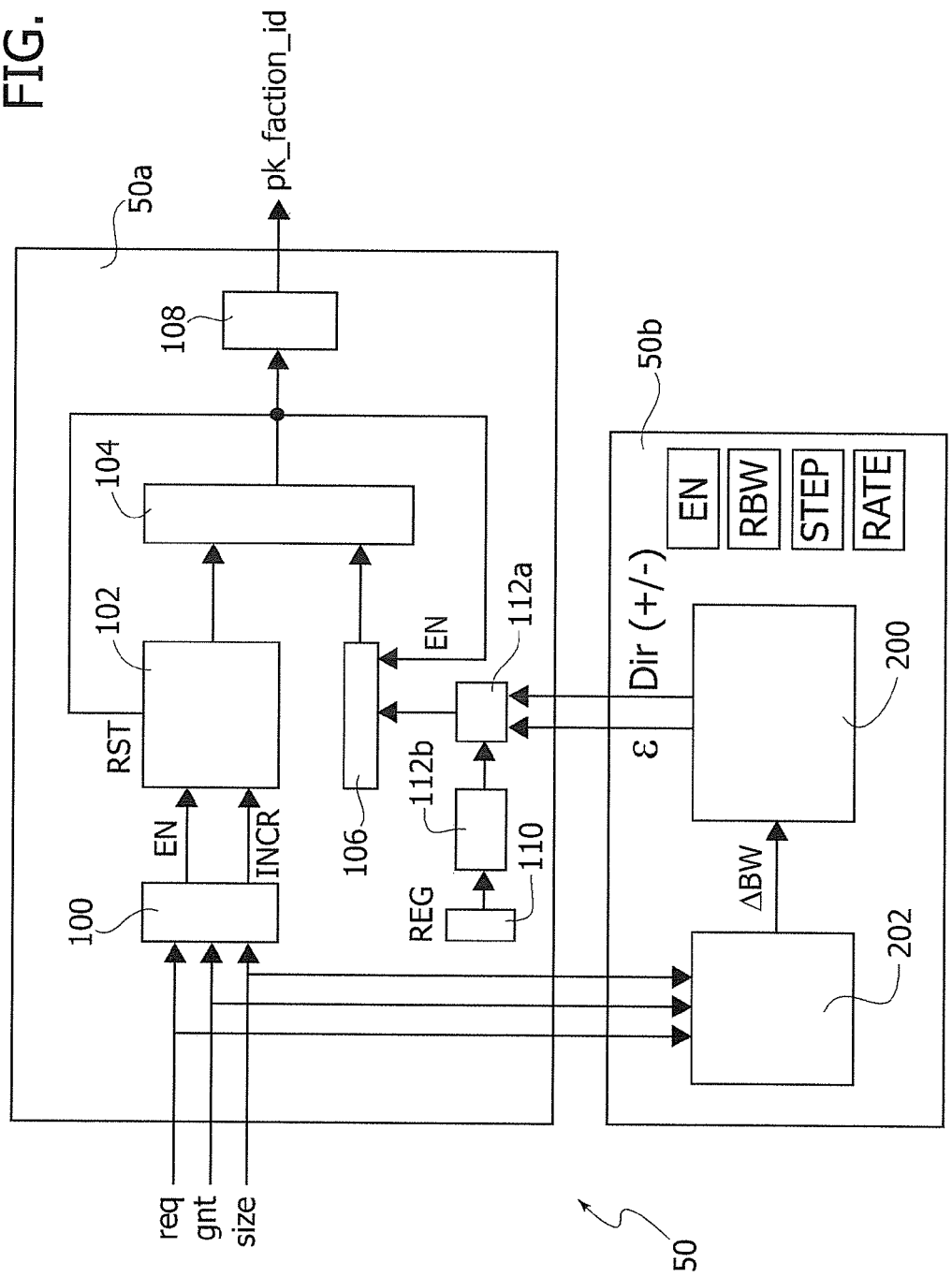
FIG. 6 illustrates a block diagram of embodiments of the present disclosure.

As already indicated, various embodiments may regard mainly the definition of the parameters "faction" sent to the module 30 of FIG. 2 by the set of elements designated as a whole by 50 in FIG. 6.

In various embodiments, the device 50 may operate so as to cause the overall bandwidth for access to the interconnection to be allocated to the various initiators IP1, IP2 . . . that compete for use of the bandwidth pursuing (as exemplified in the diagram of FIG. 4) the target of minimizing (and preferably setting to zero) the deviation between the value of bandwidth requested by each initiator IP1, IP2 and the average value of the bandwidth allocated to the same initiator during an interval considered (for example, the interval T of the diagram of FIG. 4).

In various embodiments, the duration of the interval T may depend upon various factors, such as the duration of the arbitration round, the size of the transactions, etc. In various embodiments, the interval T may be chosen as an interval sufficiently long as to make it possible to absorb (average) effects limited in time due, for example, to the fact that the transactions have a rather large size and, when they flow in the network, may not be interrupted.

In various embodiments, the maximum duration of the interval may be linked to the specific characteristics of the modules IP of the system, which in turn depend upon the particular nature of the application and upon whether they do or do not present real-time requirements.

For example, for SoC products developed in relation to video applications (Set-Top-Box, TV, etc.), some of the IP modules may present real-time requirements that may need to be met within typical time intervals in the region of a video line (~30 μs). Various embodiments may enable satisfactory control of the bandwidth in the time interval for all the cases of practical interest.

With reference to FIG. 4, it may in fact be noted that allocated to the initiator IP1 (RBW=200 MB/s) is: in the interval 0-T/2, hence for the duration T/2, a bandwidth PBW=300 MB/s; and in the interval T/2-T, hence also here for the duration T/2, a bandwidth reduced to 100 MB/s.

Consequently, the average bandwidth allocated to the initiator IP1 in the interval T is equal to (300+100)/2=200 MB/s, which corresponds precisely to a minimum deviation (zero deviation) with respect to the requested bandwidth RBW=200 MB/s.

For the initiator IP2: in the interval 0-T/2, hence for the duration T/2, no bandwidth is allocated; and in the interval T/2-T, hence also here for the duration T/2, a bandwidth PBW of 200 MB/s is allocated.

In this example, the average bandwidth allocated to the initiator IP2 in the interval T is equal to (0+200)/2=100 MB/s, which corresponds once again to a minimum (zero) deviation with respect to the requested bandwidth RBW=200 MB/s.

The block diagram of FIG. 6 refers to a possible exemplary embodiment in which the criterion (which proposes itself as an alternative to the criterion referred in the document No. US 2010/0281144 A1 already cited previously) is implemented envisaging within the device 50, in addition to a bandwidth-allocation block 50a operating substantially according to the criteria exemplified in FIG. 3, a block 50b, the function of which is to generate a corrective factor E depending upon a bandwidth-error or bandwidth-deviation value ΔBW.

The error or deviation value is defined as a difference between the value of bandwidth requested (RBW) by the individual initiator IP1, IP2, . . . and the value of bandwidth allocated to the same initiator determined on a "historic" basis, i.e., taking into account, for example, the fact that a certain initiator has used a bandwidth greater than the requested one (see, for example, the initiator IP1, which, in the left-hand part of the diagram of FIG. 4, has used a bandwidth of 300 MB/s as against its requested bandwidth RBW=200 MB/s) and/or a certain initiator has used a bandwidth smaller than the requested one (see, for example, the initiator IP2, which, in the left-hand part of the diagram of FIG. 4, has used a bandwidth of 0 MB/s as against a requested bandwidth RBW=200 MB/s).

Recalling first, with reference to FIG. 6, the structure of the block 50a, there may be noted the presence of a module 100 that receives at input (with reference to the single initiator IP1, IP2, . . . ) the data regarding the requested bandwidth (req) and the bandwidth granted, hence used (gnt), the data being in general referred to the size of the data transferred, for example the size of the packet (size).

The data req, gnt, and size are also sent to the module 50b that is to generate the corrective factor ϵ according to the modalities that will be described more fully in what follows.

Present at output from the module 100 is an enable signal EN, which enables/disables the regulation function. It is thus possible, for example, to disable the regulation function when this is not necessary (for example, because the corresponding initiator does not generate traffic for a long period of time) or else to maintain current regulation conditions.

In the example of FIG. 6, in addition to being sent to the counter 102, the signal EN is sent, via a comparator 104 set downstream of the counter 102, to a threshold module 106. The reference RST hence indicates a function of reset of the counter 102 driven starting from the output of the comparator 104.

The comparator 104 has the target of detecting the condition in which the count is equal to the threshold value. In this situation, the output of the comparator 104 switches (for example, goes to "1") and activates a module 108 designed to take into account the fact that, as will be seen more clearly in what follows, the action of regulation is performed within an interval of duration T.

In various embodiments, the module 108 may be a flip-flop of a toggle (T) type, having the purpose of inverting the pk_faction_id whenever the count reaches the threshold value.

In various embodiments, the counter 102 may be incremented whenever there is the transfer of a packet (or in general a transaction) of the corresponding amount of bytes, a condition that may be detected by the module 100 through an operation of logic AND between the signals req and gilt.

In various embodiments, the module 100 may produce at output the increment INCR to be made to the counter and an enable signal EN therefore. The increment INCR may be established by the module 100 starting from the information on the size (size) of the packet transferred (or in general of the transaction).

In various embodiments, in the case where the coding of the size of the packet (size) represents the number of bytes, the signals INCR and size may coincide. In the case of different encodings, the module 100 may also have the task of making the conversion.

In the example of FIG. 6, the references 110, 112a and 112b designate a set of modules designed to operate on the corrective factor $\epsilon$, in modulus and sign Dir (+/−)—coming from the block 50b, in particular from a correction-generation module 200.

In various embodiments, the module 110 may be a register (REG) containing the threshold value used by the algorithm described in US 2010/0281144.

In the exemplary of embodiment considered herein (which, as has been the, is an example), prior to being used as circuit for generation of the quantity faction, the value is multiplied by the component 112a by a factor equal, for example, to 4. This operation, which is not imperative, has the purpose of enabling use of registers of a small size, enabling an obvious saving of area.

In various embodiments, the corrective factor may be applied to the threshold (module 106) used in view of the generation of the quantity faction via a module 112b located at output from the component 112a. In principle, it might be, however, possible to apply the correction generated by the module 50b directly to the value coming from the register 110.

The enable signal EN used for enabling/disabling the module 50b (which in general is different from the homologous signal generated by the module 100) may be supplied by a register that may be controlled also via software.

The module 200 receives a value of bandwidth error $\Delta BW$ starting from a bandwidth-error estimator module 202 that will be described more fully in what follows.

Figure 7:
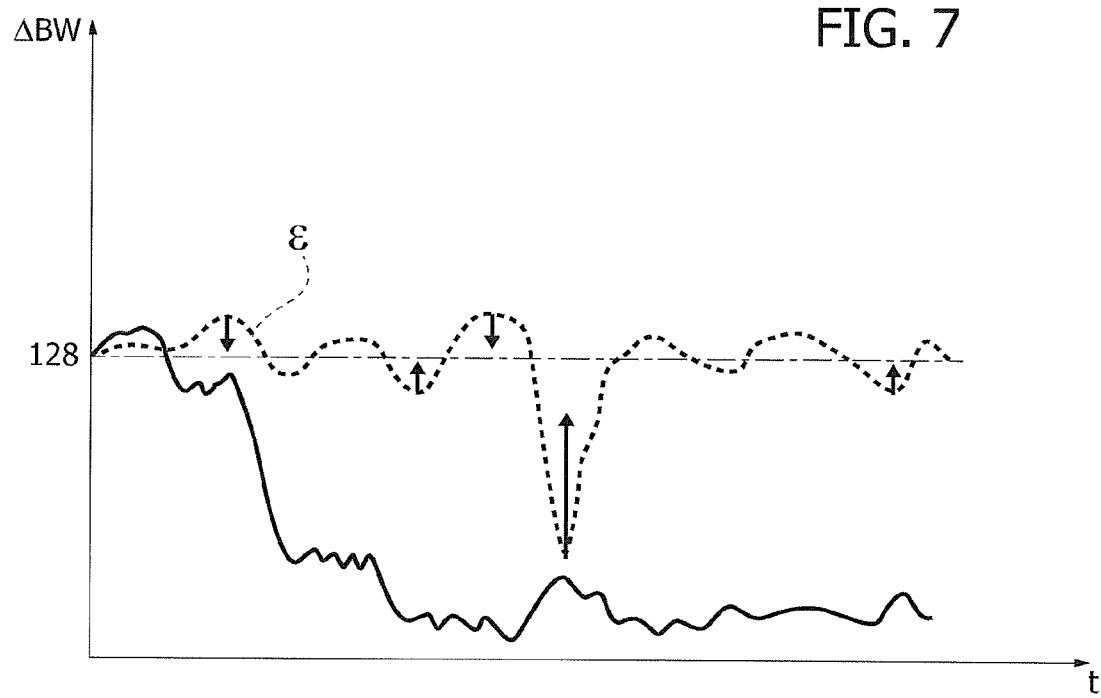
FIG. 7 illustrates a principle underlying embodiments of the present disclosure.

In various embodiments, the block 50b may perform the function schematically represented in the diagram of FIG. 7, i.e., intervene on the allocation mechanism implemented by the block 50a so as to take into account the historic evolution of the allocation mechanism (in particular within the interval T) so as to be able to compensate for unexpected and unpredictable effects.

In various embodiments, the block 50b may introduce an "elastic" effect, which, through the corrective factor $\epsilon$, tends to reach a condition of equilibrium around a condition of minimum error or deviation (preferably zero) between the requested bandwidth and the allocated bandwidth.

In the case in point, the diagram of FIG. 7 refers to a link on 128 bit so that the maximum deviation $\Delta BW$ is equal to $\pm 128 \times 16$, i.e., $\pm 2$ KB approximately, assuming, for homogeneity of example of reference, that the error estimator 202 described more fully in what follows is able to treat deviation values equal to plus or minus ($128 \times 2048 \times 16$) i.e., approximately 4 MB.

For example, it may be assumed that the deviation $\Delta BW$ will be sampled with a sampling rate, expressed in number of cycles, of $2^{(0+rate)}$, where the quantity "rate" is a parameter programmable via software in a dedicated register. In various embodiments, the maximum number of cycles allowed corresponds to the modulus of the counter REF_CNT. This corresponds to photographing in a reliable way the situation filtering the "noise" represented by the fluctuations induced by the rounds of the bandwidth-allocation strategy.

The fact that the transactions may not be interrupted (and that transfer of a transaction may require various clock cycles) means that, when observing the situation in time windows of duration comparable to the time length of one transaction, there is the risk of noting something falsified, which does not photograph the reality of things.

In various embodiments, in order to have a "reliable" idea of what is really happening on the bandwidth effectively occupied by an initiator, it may be envisaged that between two successive measurements there will elapse a time sufficiently longer than the time required to transfer a transaction.

In theory, it would be desirable that the time were at least equal to the arbitration round of the entire system. In practice, even though the sampling time is shorter than the arbitration round of the system, the effect is a fluctuation (noise) that does not represent a real tendency to "lose" or "gain" bandwidth. The longer the sampling time the smaller the effect of noise.

An excessively long sampling time may on the other hand reduce excessively the reactivity of the system (which we may be viewed as a closed-loop feedback system). A similar reasoning may be applied to another source of noise, linked to the way in which the counter ERR_CNT (204 in the scheme of FIG. 9, which will be described more fully in what follows) is decremented during a complete round of REF_CNT (214 in the scheme of FIG. 9, which will be described more fully in what follows): in this case, we may confidently state that the noise will certainly be filtered in a complete cycle of REF_CNT.

In the diagram of FIG. 7 the plot indicated by a dashed line represents the effect of the corrective factor $\epsilon$ in modulus and sign (the latter represented by the arrows) such as to cause the allocation of bandwidth (represented precisely by the dashed line as a function of time T) to have a minimum error (on average zero) with respect to the value of requested bandwidth (for example, RBW=128, with reference to the example considered).

It will be appreciated that, in various embodiments, the condition $\Delta BW=128$ may correspond to the condition of zero error. This may apply, for example, to a particular choice of implementation made for representing positive and negative bandwidth errors.

Figure 9:
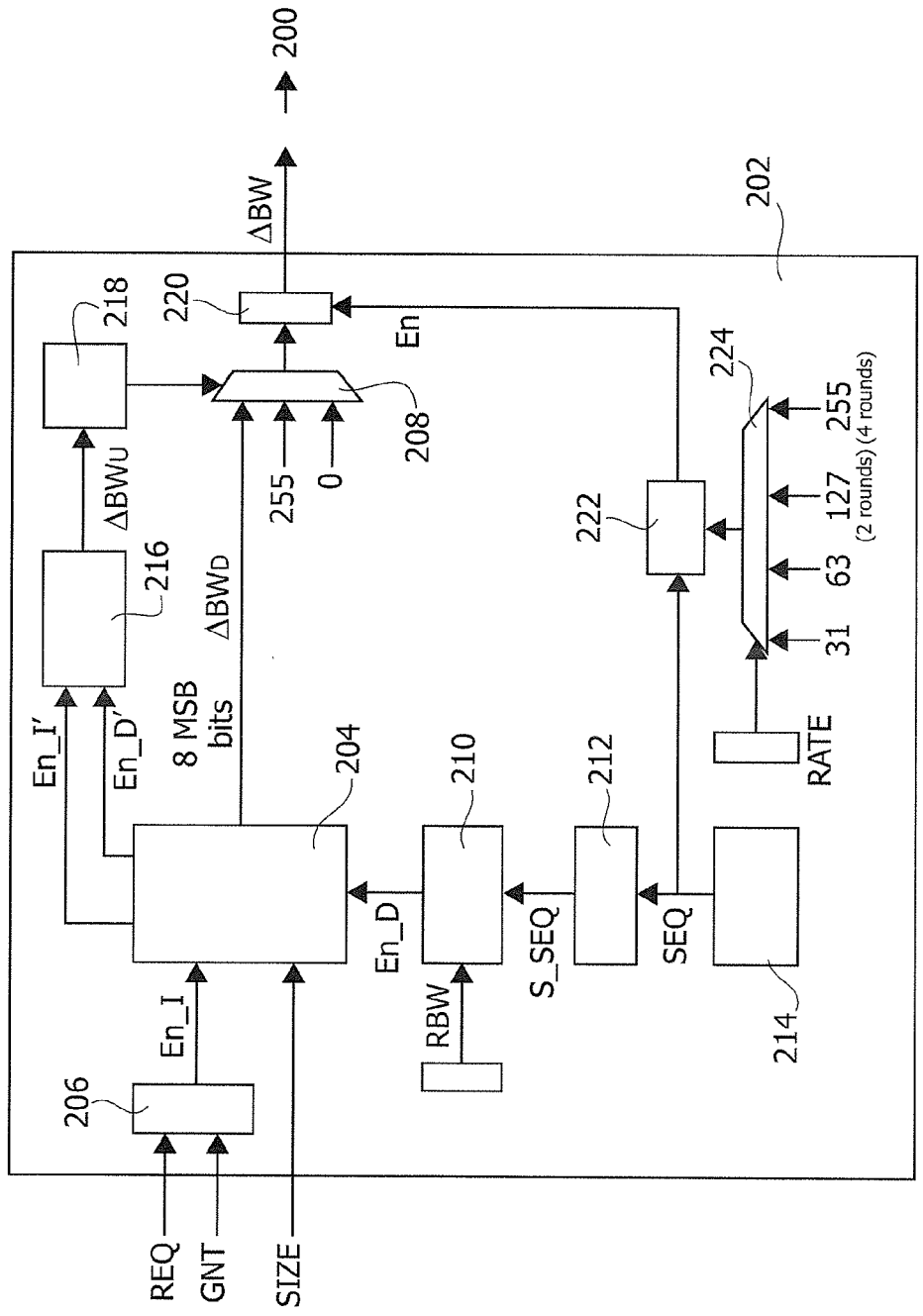
FIG. 9 is another block diagram of embodiments of the present disclosure.

If we assume, for example, that the counter 204 of FIG. 9 (on which we shall return in what follows) has been obtained using 8 bits, it may be envisaged that only 7 of these 8 bits are used to representing the modulus of the error, whilst the remaining bit is used for the sign. In this example, the condition of zero error corresponds to a count equal to 128 (i.e., $2^7$), whilst counts higher than 128 correspond to positive errors and counts lower than 128 correspond to negative errors.

The plot represented with a solid line in the same FIG. 7 is a schematic illustration of the result in terms of allocation achievable with the strategy of the diagram of FIG. 3 where, according to a fundamentally "static" behaviour, the possible loss of bandwidth may never be recovered: for example, in the diagram of FIG. 3, the initiator IP2 finds itself using, in the interval 3T/4-T, a bandwidth of 200 MB/s, when in actual fact, given that the initiator IP1 is inactive, all 300 MB/s would be available, which prevents the requirements of the initiator IP2 from being altogether met.

Figure 8:
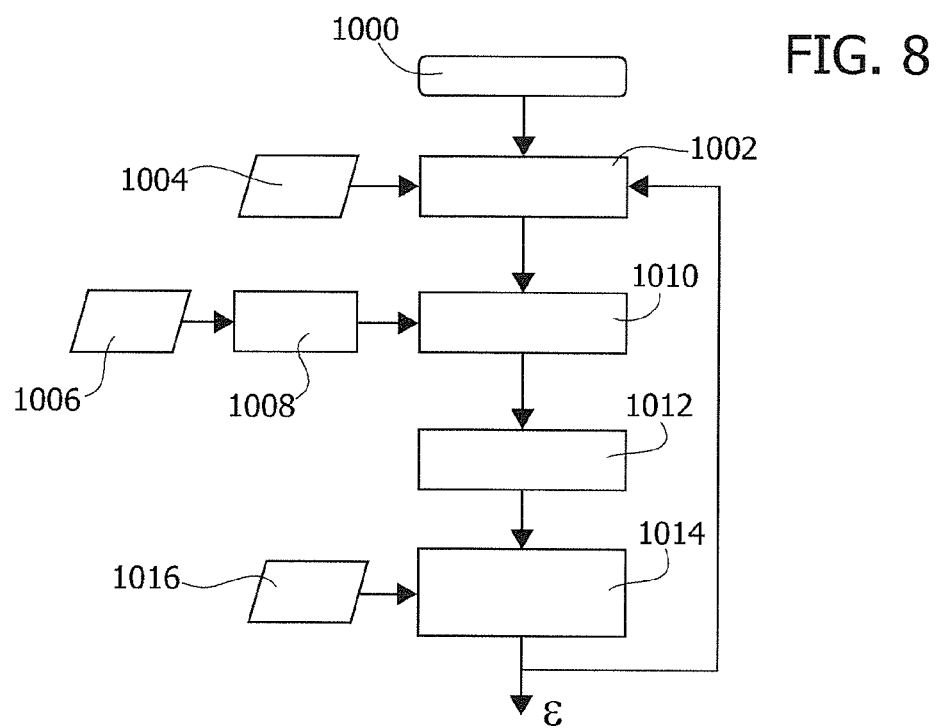
FIG. 8 illustrates a process of operation of embodiments of the present disclosure.

In the flowchart of FIG. 8, step 1000 identifies the RESET condition (signal RST of FIG. 6). The operation, based upon successive samplings of the signal LBW, may envisage that the successive samplings may being separated, for example, by a distance of 2^(0+rate) cycles.

In the flowchart of FIG. 8, the separation time between successive samplings is represented by a periodic wait step 1002 linked to the value of rate introduced at the level of regulation parameter in a step 1004.

The corrective factor $\epsilon$ is calculated according to the request in terms of bandwidth RBW, entered as input data in a step 1006. The purpose of this is thus to be able to calculate, in a step designated by 1008, and for example in the module 202 which will be described more fully in what follows, the bandwidth deviation $\Delta BW$.

Once again in the diagram of FIG. 8, step 1010 indicates a step in which, according to the sampling step or rate established in step 1002 the bandwidth deviation $\Delta BW$ coming from step 1008 is sampled.

In a step 1012 the maximum value is then sought whereby the relation $\Delta BW<i>=1(i!=7)$ applies, which corresponds to using one of the bits (e.g., the most significant bit—MSB) to encode the sign or direction of the error, calculating in a subsequent step 1014 the corrective value $\epsilon$ defined in general as $\epsilon=i\times STEP$, where STEP is an input datum entered in a step 1016.

In various embodiments, the parameter STEP makes it possible to establish the sensitivity to errors, i.e., in other words, how fast it is necessary to react to a bandwidth error in order to tend to the zero-error condition. Also this aspect may be linked to the presence of the possible noise due to transactions, arbitration rounds, etc.

The effects of a more or less long STEP may be difficult to predict, with the consequent need to taking into account the risk of making excessively large corrections. In various embodiments it is hence possible to add also this parameter, possibly rendering it programmable via software and hence modifiable also in a subsequent post-production step during the development of the application software.

In various embodiments, the value of requested bandwidth RBW is a fraction of the overall capacity of the link (interconnection) that may be expressed as C_link. In the case, for example, of a value on eight bits ($2^8=64$ different possible values) the quantity RBW may be expressed as:

$$RBW=63\times RBW\_byte/C\_link\_byte$$

where $RBW\_byte$ and $C\_link\_byte$ indicate, respectively, the requested bandwidth expressed in Bytes/s and the link capacity, i.e., the band offered by the interconnection, which is also expressed in Bytes/s.

In various embodiments, the number of bits used for encoding RBW corresponds to the number of bits used for implementing the counter REF_CNT (for example, if REF_CNT uses 9 bits, in the previous formula the number 63 would be replaced with 127).

Accordingly, $\Delta BW$ may be a signal on eight bits with the first seven bits 0:6 that represent the modulus of the error $\epsilon$ and the bit 7 (i.e., the eighth bit) that represents the sign of the error.

For example, a value $\Delta BW<7:0>=10101011$ means that the bandwidth used has been in excess respect to the requested bandwidth by an amount corresponding to (0101011), i.e., 43 cycles.

Higher deviations of the maximum/minimum values allowed might lead to an effect of saturation, but this does not entail the loss of the "historic" information, thanks to the capacity of the bandwidth-error estimation module (202 in the block diagram of FIG. 6) of carrying out tracking actions, for example, for values of up to ±4 MB (see the example of implementation of FIG. 9).

In various embodiments, the maximum threshold deviation may be linked to the maximum value of the corrective factor $\epsilon$, e.g., $MAX\epsilon=6.STEP$.

The block diagram of FIG. 9 illustrates a possible implementation of the bandwidth-error estimation module 202 that uses the principle of accumulating the bandwidth error via a counter in such a way that the amount of data transferred is added, whereas the expected amount is subtracted.

In the diagram of FIG. 9, the reference number 204 designates the counter ERR_CNT already mentioned previously and designed to implement the error accumulator, according to the datum of size represented by the parameter size, which represents (assuming, for example, working on a transaction/packet basis) the size of the transaction/packet in progress.

In this regard, in various embodiments, the counter ERR_CNT 204 may work on a word basis (in the example 8-B words), in a time window of a predefined duration established by the modulus of the counter REF_CNT, which has also been already mentioned previously and is designated by 214. Subtracted from the value of the counter ERR_CNT 204 is, as a whole, an amount corresponding to the requested bandwidth (RBW) and added thereto is, as a whole, an amount corresponding to the number of the data transferred.

According to one example of the present disclosure, if the modulus of REF_CNT is 64, the capacity Clink of the link or interconnection is 100 MB/s, and RBW is 50 MB/s, the ratio RBW/Clink is RBW/Clink=50/100=1/2 and, during the reference window of 64 cycles (REF_CNT) for half of the times (i.e., 32) unity is subtracted from ERR_CNT. If in the same window of 64 cycles there occurs the transfer of 2 transactions/packets each made up of 8 words, the counter ERR_CNT is decremented twice by the amount 8. The overall result at the end of the reference window will be ERR_CNT[k+1]=ERR_CNT[k]−32+16, in other words during this period there has been a loss of bandwidth, and the final state of the counter reflects this history.

In various embodiments, the counter 204 may operate on two input signals En_I (up count, "Increment") and En_D (down count, "Decrement"). The signal En_I derives from the logic product, performed, for example, in an AND port 206, between the request signals REQ and the grant signal GNT. The value of count of the counter 204 (represented, for example, by the 8 most significant bits) represents a "raw" datum of the bandwidth error $\Delta BW_D$ that is supplied to a multiplexer 208.

The signal En_D comes from a comparator 210, which receives, on one input, the value of the requested bandwidth RBW and, on the other, a signal S_SEQ coming from a mixer 212, which in turn receives at input a signal SEQ arriving from a reference counter 214 with the function of distributing the count decrements ERR_CNT according to a criterion that may be exemplified as follows:

SEQ> 0 1 2 3 4 5 6 7
S_SEQ> 0 7 2 5 4 3 6 1 where the elements 0 1 2 3 correspond to decrements of the factor ERR_CNT.

To return to the example made above, it will be appreciated that, in the absence of the mixer 212, the decrement signal En_D might be generated by a direct comparison between the output of the value REF_CNT (SEQ) of the module 214 and the requested bandwidth RBW. Consequently, (once again with reference to the previous quantitative example) the 32 decrements would be concentrated in the first half of the reference window defined by the value REF_CNT. Thanks to the mixer the 32 decrements may be evenly distributed over the entire reference window. This has the effect of reducing the second of the sources of noise mentioned above, and hence of enabling reliable measurements even in the case where the sampling time is less than the number of cycles of the reference window defined by REF_CNT. The example made above refers to the case in which REF_CNT is present on 3 bits, hence with eight possible values, represented, that is, by the elements 0 to 7. Concrete embodiments may envisage the presence of 6 bits with RBW=4.

A further saturation counter 216 receives increment count signals En_I' and decrement count signals En_D', different from the signals En_I and En_D sent to the counter ERR_CNT 204, in so far as they are generated using, respectively, the positive saturation conditions (ERR_CNT=255) and negative saturation conditions (ERR_CNT=0) of the counter ERR_CNT 204.

In various embodiments, the saturation counter SAT_CNT 216 may hence count the number of positive or negative saturations of ERR_CNT. In other words, it is an extension of the counter ERR_CNT 204 used only internally to maintain an "older" history than what is possible with the counter ERR_CNT 204.

In various embodiments, the error information propagated at output by the error-measuring module (block 202) to the correction generator (block 200) may be limited to just the ERR_CNT appropriately "treated" with the saturation logic (SAT Logic+Mux). In various embodiments, the saturation counter 216 may be managed like the counter ERR_CNT 204, i.e., with the most significant bit that represents the sign, it being possible to have positive or negative saturations.

In various embodiments, the corresponding signal may be supplied to a saturation logic 218 that drives the multiplexer 208 in such a way that it may send at output to an output module 220, selectively: the value of count ERR_CNT of the counter 204 (i.e., the deviation or difference $\Delta BW_D$), if there have not been positive or negative saturations (considering handling of the sign, and once again with reference to the previous quantitative example, this is equivalent to saying that the saturation counter is 2048); 255 if the saturation counter is positive (>2048); or 0 if the saturation counter is negative (<2048).

The signal SEQ at output from the counter 214 is moreover sent to a comparator 222 where it is compared with a signal coming from a multiplexer 224, which, according to the input datum RATE, may assume a fixed value chosen from among various values (for example 31, 63, 127, 255) representing the length of the interval (for example, the number of rounds) on which it is intended to carry out the action of generation of the corrective factor $\epsilon$.

The output signal of the comparator 222 is sent as threshold enable signal En to the module 220, which generates at output the signal $\Delta BW$.

In various embodiments, the module 220 that generates the signal $\Delta BW$ may be a register, and the signal En merely enables updating of the register.

The signal $\Delta BW$ is designed to be sent to the module generator 220 that generates the signal $\epsilon$ (modulus and sign) to be transferred to the allocation block 50a.

Figure 10:
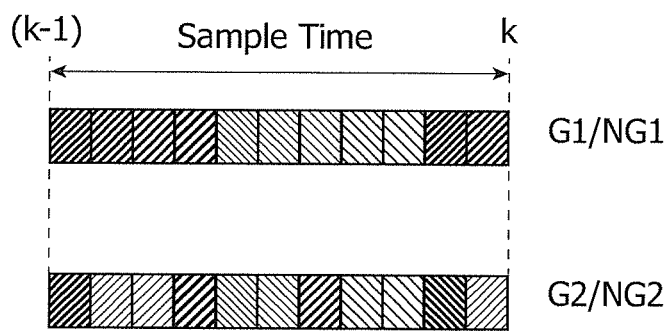
FIG. 10 illustrates possible criteria of operation of embodiments of the present disclosure.

With reference to the diagram of FIG. 10, the value of the parameter rate (basically, the data-communication rate) that may be involved determines the length of the sampling interval corresponding to the two successive instants k−1, k, k+1, . . . , i.e., the duration of the interval (see, for example, the interval T of the diagram of FIG. 4) on which the action of direct control is performed to render the deviation between the bandwidth used and the bandwidth requested by the single initiator minimum (zero).

It will be appreciated, on the other hand, that, as has already been the previously, the interval T represented in the FIGURE may not be uniquely given by the sampling time defined by the mechanism described herein, it being possible to link the duration of the interval T to a plurality of factors.

The diagram of FIG. 10 illustrates how, in various embodiments, during the interval considered (sampling time) it is possible to carry out an (algebraic) addition in which: the data transferred, represented in the top part of the diagram of FIG. 10, are summed, i.e., added with positive sign; the data transfer of which is expected, represented in the bottom part of FIG. 10, are subtracted, i.e., added with negative sign.

The foregoing is done distinguishing between the data for which access has been granted ("Granted") G1, G2, represented by a dark color created by the cross-hatching and those for which access has not been granted ("Not Granted"), NG1, NG2 represented by a light color created by the cross-hatching.

Basically, it is the same or a similar mechanism already described previously in a qualitative way and by means of an example. In other words, the value of deviation $\Delta BW$ at the instant k, designated by $\Delta BW(k)$, is calculated in a recurrent way starting from the value at the instant k−1, designated by $\Delta BW(k-1)$, according to the relation:

$$\Delta BW(k) = \Delta BW(k-1) + G1 - G2$$

The above procedure corresponds in practice to the general criterion of calculating the bandwidth $BW_x$ allocated to a generic initiator x, as a function of the overall bandwidth $BW_{TOT}$ according to the thresholds associated to all the initiators of the system on the basis the formula recalled previously. Various embodiments aim precisely at obtaining that the result achieved in practice is as close as possible to the theoretical result.

Of course, without prejudice to the principle of the present disclosure, the details of construction and the embodiments may vary, even very significantly, with respect to what has been illustrated herein purely by way of non-limiting example, without thereby departing from the extent of protection of the present disclosure; the extent of protection is determined by the annexed claims.

The invention claimed is:

1. A control device to allocate a total bandwidth of a resource available for allocation, the control device comprising:
    an estimator configured to detect a difference between a value of bandwidth allocated to a set of initiators and a value of bandwidth requested by the initiators, wherein the difference is calculated as a count value of a counter configured to count upward as a function of an amount of data transferred between the initiators and the resource and to count downward as a function of the amount of data expected to be transferred between the initiators and the resource, and wherein the initiators compete for allocation of the total bandwidth of the resource; and
    a communication arbiter configured to allocate the total bandwidth to the initiators by dynamically reducing an average value of the difference, wherein the counter is configured to ignore, for the purposes of the count value, data expected to be transferred between the initiators and the resource for which the communication arbiter denies transfer between the initiators and the resource.

2. The control device of claim 1, wherein the communication arbiter is configured to allocate the total bandwidth to the initiators by dynamically reducing to zero the average value of the deviation.

3. The control device of claim 1, wherein the initiators are configured to use the resource operating at a given data communication rate, and the control device is configured to calculate the average value of the difference by operating on samples of the difference sampled at a sampling rate which is a function of the data communication rate.

4. The control device of claim 1, wherein the communication arbiter is configured to allocate the total bandwidth to the initiators with an allocation mechanism arranged in cycles or rounds, and the estimator is configured to calculate the average value of the difference by operating on samples of the difference sampled at a sampling rate that is a function of a duration of one or more of the rounds or cycles.

5. The control device of claim 1, wherein the resource is an interconnection.

6. The control device of claim 1, wherein the resource is a network interconnection comprising a Network-on-Chip (NoC).

7. A method of allocating a total bandwidth of a resource available for allocation, the method comprising:
  detecting a difference between a value of bandwidth allocated to a set of initiators and a value of bandwidth requested by the initiators, wherein the difference is calculated as a count value of a counter configured to count upward as a function of an amount of data transferred between the initiators and the resource and to count downward as a function of the amount of data expected to be transferred between the initiators and the resource, and wherein the initiators compete for allocation of the total bandwidth of the resource;
  ignoring, for the purposes of the count value, data expected to be transferred between the initiators and the resource but wherein such data expected to be transferred is denied transfer between the initiators and the resource; and
  allocating the total bandwidth to the initiators by dynamically reducing an average value of the difference.

8. The method of claim 7, further comprising:
  allocating the total bandwidth to the initiators by dynamically reducing to zero the average value of the deviation.

9. The method of claim 7, wherein the initiators use the resource operating at a given data communication rate, the method further comprising:
  calculating the average value of the difference by operating on samples of the difference sampled at a sampling rate which is a function of the data communication rate.

10. The method of claim 7, further comprising:
  allocating the total bandwidth to the initiators with an allocation mechanism arranged in cycles or rounds; and
  calculating the average value of the difference by operating on samples of the difference sampled at a sampling rate which is a function of a duration of one or more of the rounds or cycles.

11. The method of claim 7, wherein the resource is an interconnection.

12. The method of claim 7, wherein the resource is a network interconnection comprising a Network-on-Chip (NoC).

13. A system, comprising:
  a resource having a total bandwidth available for allocation;
  a set of initiators configured to compete for the allocation of the total bandwidth; and
  a control device configured to detect a difference between a value of bandwidth allocated to the initiators and a value of bandwidth requested by the initiators, said difference calculated as a count value of a counter configured to count upward as a function of an amount of data transferred between the initiators and the resource and to count downward as a function of the amount of data expected to be transferred between the initiators and the resource, and to allocate the total bandwidth to the initiators by dynamically reducing an average value of the difference, wherein the counter is configured to ignore, for the purposes of the count value, data expected to be transferred between the initiators and the resource for which the communication arbiter denies transfer between the initiators and the resource.

14. The system of claim 13, wherein the control device is configured to allocate the total bandwidth to the initiators by dynamically reducing to zero the average value of the deviation.

15. The system of claim 13, wherein the initiators are configured to use the resource operating at a given data communication rate, and the control device is configured to calculate the average value of the difference by operating on samples of the difference sampled at a sampling rate which is a function of the data communication rate.

16. The system of claim 13, wherein the control device is configured to allocate the total bandwidth to the initiators with an allocation mechanism arranged in cycles or rounds, and the estimator is configured to calculate the average value of the difference by operating on samples of the difference sampled at a sampling rate which is a function of a duration of one or more of the rounds or cycles.

* * * * *